(12) United States Patent
Li et al.

(10) Patent No.: US 11,129,178 B2
(45) Date of Patent: Sep. 21, 2021

(54) COMMUNICATION RESOURCE ALLOCATION METHOD, ALLOCATION DEVICE, BASE STATION AND TERMINAL

(71) Applicant: YULONG COMPUTER TELECOMMUNICATION SCIENTIFIC (SHENZHEN) CO., LTD., Shenzhen (CN)

(72) Inventors: Ming-Ju Li, Shenzhen (CN); Ya-Jun Zhu, Shenzhen (CN); Yun-Fei Zhang, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 377 days.

(21) Appl. No.: 16/313,476

(22) PCT Filed: Nov. 30, 2016

(86) PCT No.: PCT/CN2016/107907
§ 371 (c)(1),
(2) Date: Dec. 27, 2018

(87) PCT Pub. No.: WO2018/000712
PCT Pub. Date: Jan. 4, 2018

(65) Prior Publication Data
US 2019/0320450 A1    Oct. 17, 2019

(30) Foreign Application Priority Data
Jun. 27, 2016 (CN) .......................... 201610482642.9

(51) Int. Cl.
*H04W 28/02* (2009.01)
*H04W 4/00* (2018.01)
(Continued)

(52) U.S. Cl.
CPC ....... *H04W 72/1263* (2013.01); *H04L 1/1819* (2013.01); *H04W 4/70* (2018.02);
(Continued)

(58) Field of Classification Search
CPC ........... H04W 72/087; H04W 72/1263; H04W 72/042; H04W 72/0446; H04W 72/0453;
(Continued)

(56) References Cited

U.S. PATENT DOCUMENTS 9,999,048 B2 * 6/2018 Tang .................... H04W 72/048
2011/0294496 A1 * 12/2011 Hirakawa ............. H04W 48/02
455/422.1

(Continued)

FOREIGN PATENT DOCUMENTS

| CN | 104584662 B | 4/2015 |
| CN | 105979597 A | 9/2016 |
| WO | 2016070838 A1 | 5/2016 |

*Primary Examiner* — Edan Orgad
*Assistant Examiner* — Vanneilian Lalchinthang
(74) *Attorney, Agent, or Firm* — ScienBiziP, P.C.

(57) ABSTRACT

A communication resource allocation method, an allocation device, a base station and a terminal are provided. The communication resource allocation method includes: determining a service type of a current service when a service bearer is established; determining granularity information of time-frequency resource and a frequency domain resource range corresponding to the service type according to the service type of the current service; and transmitting the granularity information of the time-frequency resource and the frequency domain resource range corresponding to the service type to a terminal that requests to establish the service bearer. The technical solution of the present disclosure can flexibly adjust the granularities of the time-frequency resource and the frequency domain resource range correspondingly according to different types of services, and realize that the resource scheduling can flexibly adapt to (Continued)

different types of services, thereby facilitating the improvement of resource utilization ratio.

19 Claims, 9 Drawing Sheets

(51) Int. Cl.
*H04W 72/12* (2009.01)
*H04W 4/70* (2018.01)
*H04W 76/27* (2018.01)
*H04L 1/18* (2006.01)
*H04W 72/04* (2009.01)

(52) U.S. Cl.
CPC ..... *H04W 72/042* (2013.01); *H04W 72/0446* (2013.01); *H04W 72/0453* (2013.01); *H04W 76/27* (2018.02)

(58) Field of Classification Search
CPC . H04W 72/0493; H04W 76/27; H04W 88/02; H04W 88/06; H04W 4/70; H04W 72/044; H04W 28/0226; H04L 1/1819; H04L 5/0064; H04L 67/12

USPC .......................................................... 370/329
See application file for complete search history.

(56) References Cited

U.S. PATENT DOCUMENTS

| | | | |
|---|---|---|---|
| 2013/0039319 A1* | 2/2013 | Shi | H04L 27/2613 370/329 |
| 2014/0194155 A1* | 7/2014 | Ko | H04B 1/406 455/552.1 |
| 2015/0085690 A1* | 3/2015 | Yl | H04W 24/02 370/252 |
| 2016/0050621 A1* | 2/2016 | Enomoto | H04W 72/04 370/311 |
| 2017/0078830 A1* | 3/2017 | Wu | H04W 4/70 |
| 2017/0223625 A1* | 8/2017 | Liu | H04W 28/16 |
| 2017/0338987 A1* | 11/2017 | Zhou | H04W 74/0833 |
| 2017/0367003 A1* | 12/2017 | Zhang | H04W 8/08 |
| 2018/0206137 A1* | 7/2018 | Ryu | H04W 4/70 |
| 2019/0075561 A1* | 3/2019 | Tang | H04W 72/04 |

* cited by examiner

COMMUNICATION RESOURCE ALLOCATION METHOD, ALLOCATION DEVICE, BASE STATION AND TERMINAL

CROSS-REFERENCE TO RELATED APPLICATIONS

The application claims priority of Chinese Patent Application No. 201610482642.9, entitled "Communication Resource Allocation Method, Allocation Device, Base Station and Terminal," filed on Jun. 27, 2016 in the China National Intellectual Property Administration (CNIPA), the entire contents of which are incorporated by reference herein.

FIELD

The embodiments of the present disclosure relates to technical fields of communications, specifically a communication resource allocation method, a communication resource allocation device, a base station and a terminal.

BACKGROUND

Existing 4G and 4.5G mobile communication technologies are all radio access technologies based on Long Term Evolution (LTE) and LTE-Advanced (LTE-A), time-frequency resource granularities, frame structures and the like. For example, the maximum single carrier bandwidth supported by the current LTE system is 20 MHz; and the wider bandwidth can only be supported by use of carrier aggregation (CA). In addition, current frame structures mainly include: an frequency division duplexing (FDD) frame structure, a Time Division Duplexing (TDD) frame structure, and a dynamic frame structure for an LTE assisted access (LAA) unlicensed carrier. No matter what kind of frame structure, each frame includes ten subframes, each subframe is 1 ms and includes two slots. Each slot is 0.5 ms and includes seven symbols. In an aspect of frequency domains, in an LTE system, subcarrier space is mainly 15 KHz, and one resource block (RB) includes twelve subcarriers. Narrow band Internet of things (NB-IoT) proposes a novel 3.75 KHz subcarrier space, and the carrier bandwidth of the NB-IoT is merely 180 KHz.

In an aspect of resource allocation, the FDD frame structure and the TDD frame structure both adopt the 1 ms subframe as time domain scheduling granularity. With eexceptions when the Downlink Pilot Time Slot (DwPTS) in a special subframe in the TDD frame structure is used to transmit data, the time domain scheduling granularity is less than 1 ms. Similarly, the frame structure for an LAA unlicensed carrier also uses a multiplexing DwPTS as a downlink scheduling time domain granularity of partial subframes, and uses the scheduling granularity of 1 ms integral subframe. In the FDD frame structure and the TDD frame structure, the special subframe in the TDD frame structure can be used for both downlink transmission and uplink transmission, and for the other subframes, the uplink transmission or the downlink transmission are divided into time domain or frequency domain. The partial subframes in the frame structure for an LAA unlicensed carrier may also include a subframe, the front half part of which is used for downlink transmission and the latter half part of which is used for uplink transmission.

Furthermore, with regard to uplink scheduling, a time interval between the LTE system transmits a UL grant through the uplink and the time that the subframe transmits real uplink data is generally 4 ms. And an hybrid automatic repeat request (HARQ) ACK/NACK feedback is generally transmitted after 4 ms or more after the corresponding data is transmitted.

Therefore, the current frame structures and granularities of the frequency domain resource cannot allocate resources flexibly; the time interval between an uplink scheduling mechanism and an HARQ feedback mechanism causes large latency, even 20 MHz cannot satisfy the high bandwidth requirement.

The 5G communication in the future mainly includes the following three scenarios: enhanced Mobile Broadband (eMBB), massive Machine Type Communication (mMTC), and Ultra-Reliable and Low Latency Communications (URLLC). The three scenarios are used for different types of services, and have different requirements. For example, two main indicators of an eMBB service are a high bandwidth and a low latency. High frequency communication in the future, the eMBB service may support 100 MHz bandwidth. Moreover, it is probable that at a certain time, the entire bandwidth may be directly allocated to a single user for use.

Uplink scheduling latency and HARQ feedback latency also cause an latency influence. An mMTC service requires narrow band services, and requires a battery having an extremely long service life; such a service requires frequency domain resources having smaller granularity and time domain resources having wider granularity. The URLLC service also requires reduction in the latency influence caused by the uplink scheduling latency and the HARQ feedback latency.

In other words, due to various services, the current fixed frame structures, fixed granularity of the frequency domain resource and time domain resource granularity may cause large uplink scheduling latency and long HARQ feedback latency. Moreover, smaller carrier bandwidth cannot satisfy various service requirements. The above-described technical problems need to be solved urgently.

SUMMARY

In view of the above, according to a first aspect of the present disclosure, a communication resource allocation method is provided and includes: determining a service type of a current service when a service bearer is established; determining granularity information of time-frequency resource and a frequency domain resource range corresponding to the service type according to the service type of the current service; and transmitting the granularity information of the time-frequency resource and the frequency domain resource range corresponding to the service type to a terminal that requests to establish the service bearer.

The granularity information of the time-frequency resource includes a granularity of frequency domain resource and a granularity of time domain resource. The granularity of the frequency domain resource is a subcarrier spacing, and the granularity of the time domain resource is a transmission time interval.

In the above-mentioned technical solution, optionally, the step of determining granularity information of the time-frequency resource and the frequency domain resource range corresponding to the service type according to the service type of the current service, specifically includes: determining the granularity of the time domain resource to be 1 ms, the granularity of the frequency domain resource to be 15 KHz, and the frequency domain resource range to be the whole or a part of a range of an entire bandwidth, when the current service is an LTE service.

In any one of the above-mentioned technical solutions, optionally, the step of determining the granularity information of the time-frequency resource and the frequency domain resource range corresponding to the service type according to the service type of the current service, specifically includes: determining the granularity of the time domain resource to be $T_1$, the granularity of the frequency domain resource to be $F_1$, and the frequency domain resource range to be the whole or a part of the range of the entire bandwidth, when the current service is an eMBB service, wherein $T_1 \leq 1$ ms, and $F_1 > 15$ KHz.

In any one of the above-mentioned technical solutions, optionally, the step of determining the granularity information of the time-frequency resource and the frequency domain resource range corresponding to the service type according to the service type of the current service, specifically includes: determining the granularity of the time domain resource to be $T_2$, the granularity of the frequency domain resource to be $F_2$, and the frequency domain resource range to be a part of the range of the entire bandwidth, when the current service is an mMTC service, wherein $T_2 \geq 1$ ms, and $F_2 \leq 15$ KHz.

In any one of the above-mentioned technical solutions, optionally, the step of determining the granularity information of the time-frequency resource and the frequency domain resource range corresponding to the service type according to the service type of the current service, specifically includes: determining the granularity of the time domain resource to be $T_3$, the granularity of the frequency domain resource to be $F_3$, and the frequency domain resource range to be a part of the range of the entire bandwidth, when the current service is a URLLC service, wherein $T_3 \ll 1$ ms, and $F_3 \geq 15$ KHz.

In one embodiment of the present disclosure, the step of transmitting the granularity information of the time-frequency resource and the frequency domain resource range corresponding to the service type to the terminal that requests to establish the service bearer, specifically includes: dividing the entire bandwidth into a plurality of frequency domain resource ranges having equal bandwidths, and indicating to the terminal a start point of the frequency domain resource range corresponding to the service type on the entire bandwidth. The plurality of frequency domain resource ranges may not be overlapped or may be partially overlapped.

In another embodiment of the present disclosure, the step of transmitting the granularity information of the time-frequency resource and the frequency domain resource range corresponding to the service type to the terminal that requests to establish the service bearer, specifically includes: dividing the entire bandwidth into a plurality of frequency domain resource ranges having unequal bandwidths, and indicating to the terminal a bandwidth size and a start point of the frequency domain resource range corresponding to the service type on the entire bandwidth, or indicating to the terminal a start point and an end point of the frequency domain resource range corresponding to the service type on the entire bandwidth. The plurality of frequency domain resource ranges may not be overlapped or may be partially overlapped.

In any one of the above-mentioned technical solutions, optionally, the frequency domain resource range includes a first frequency domain range for transmitting a reference signal and a second frequency domain range for transmitting data, the first frequency domain range and the second frequency domain range may not be overlapped, may be partially overlapped or may be completely overlapped.

In the technical solution, the frequency domain resource range corresponding to the service type indicated to the terminal by the base station includes a frequency domain range (namely the first frequency domain range) for transmitting a reference signal, and a frequency domain range (namely the second frequency domain range) for transmitting data, the two frequency domain ranges may not be overlapped, may be partially overlapped or may be completely overlapped. The reference signal mainly refers to a reference signal for synchronization and radio resource management (RRM) measurement.

In any one of the above-mentioned technical solutions, optionally, the granularity information of the time-frequency resource and the frequency domain resource range corresponding to the service type are transmitted to the terminal that requests to establish the service bearer via a Radio Resource Control (RRC) signaling.

In any one of the above-mentioned technical solutions, optionally, the method further includes: indicating, via a Downlink Control Information (DCI) signaling, resource block information that is scheduled and allocated to use when the terminal processes the current service, the resource block information includes frequency domain resource selected from the frequency domain resource range corresponding to the service type.

According to a second aspect of the present disclosure, a communication resource allocation method is further provided and includes: receiving a first signaling and a second signaling transmitted by a base station; acquiring, according to the first signaling, granularity information of time-frequency resource and a frequency domain resource range determined by the base station according to a service type of a current service, and acquiring, according to the second signaling, frequency domain resource selected and allocated by the base station in the frequency domain resource range; determining resource block information allocated by the base station and used for processing the current service, according to the granularity information of the time-frequency and the frequency domain resource; and processing the current service based on the resource block information.

In the above-mentioned technical solution, optionally, the first signaling is an RRC signaling, and the second signaling is a DCI signaling.

According to a third aspect of the present disclosure, a communication resource allocation device is provided and includes: a first determination unit, configured to determine a service type of a current service when a service bearer is established; a second determination unit, configured to determine granularity information of time-frequency resource and a frequency domain resource range corresponding to the service type according to the service type of the current service determined by the first determination unit; and a transmission unit, configured to transmit the granularity information of the time-frequency resource and the frequency domain resource range corresponding to the service type determined by the second determination unit, to a terminal that requests to establish the service bearer.

The granularity information of the time-frequency resource includes a granularity of frequency domain resource and a granularity of time domain resource. The granularity of the frequency domain resource is a subcarrier spacing, and the granularity of the time domain resource is a transmission time interval.

In the above-mentioned technical solution, optionally, the second determination unit is specifically configured to: determine the granularity of the time domain resource to be 1 ms, the granularity of the frequency domain resource to be 15 KHz, and the frequency domain resource range to be the whole or a part of a range of an entire bandwidth, when the current service is an LTE service.

In any one of the above-mentioned technical solutions, optionally, the second determination unit is specifically configured to: determine the granularity of the time domain resource to be $T_1$, the granularity of the frequency domain resource to be $F_1$, and the frequency domain resource range to be the whole or a part of the range of the entire bandwidth, when the current service is an eMBB service, wherein $T_1 \leq 1$ ms, and $F_1 > 15$ KHz.

In any one of the above-mentioned technical solutions, optionally, the second determination unit is specifically configured to: determine the granularity of time domain resource to be $T_2$, the granularity of the frequency domain resource to be $F_2$, and the frequency domain resource range to be a part of the range of the entire bandwidth, when the current service is an mMTC service, wherein $T_2 \geq 1$ ms, and $F_2 \leq 15$ KHz.

In any one of the above-mentioned technical solutions, optionally, the second determination unit is specifically configured to: determine the granularity of the time domain resource to be $T_3$, the granularity of the frequency domain resource to be $F_3$, and the frequency domain resource range to be a part of the range of the entire bandwidth, when the current service is a URLLC service, wherein $T_3 \ll 1$ ms, and $F_3 \geq 15$ KHz.

In one embodiment of the present disclosure, the transmission unit is specifically configured to: divide the entire bandwidth into a plurality of frequency domain resource ranges having equal bandwidths, and indicating to the terminal a start point of the frequency domain resource range corresponding to the service type on the entire bandwidth. The plurality of frequency domain resource ranges may not be overlapped or may be partially overlapped.

In another embodiment of the present disclosure, the transmission unit is specifically configured to: divide the entire bandwidth into a plurality of frequency domain resource ranges having unequal bandwidths, and indicating to the terminal a bandwidth size and a start point of the frequency domain resource range corresponding to the service type on the entire bandwidth, or indicating to the terminal a start point and an end point of the frequency domain resource range corresponding to the service type on the entire bandwidth. The plurality of frequency domain resource ranges may not be overlapped or may be partially overlapped.

In any one of the above-mentioned technical solutions, optionally, the frequency domain resource range includes a first frequency domain range for transmitting a reference signal and a second frequency domain range for transmitting data, the first frequency domain range and the second frequency domain range may not be overlapped, may be partially overlapped or may be completely overlapped.

In the technical solution, the frequency domain resource range corresponding to the service type indicated to the terminal by the base station includes a frequency domain range (namely the first frequency domain range) for transmitting a reference signal, and a frequency domain range (namely the second frequency domain range) for transmitting data, the two frequency domain ranges may not be overlapped, may be partially overlapped or may be completely overlapped. The reference signal mainly refers to a reference signal for synchronization and RRM measurement. In any one of the above-mentioned technical solutions, optionally, the granularity information of the time-frequency resource and the frequency domain resource range corresponding to the service type are transmitted to the terminal that requests to establish the service bearer via an RRC signaling.

In any one of the above-mentioned technical solutions, optionally, the transmission unit is further configured to: indicate, via a DCI signaling, resource block information that is scheduled and allocated to use when the terminal processes the current service, the resource block information includes frequency domain resource selected from the frequency domain resource range corresponding to the service type.

According to a fourth aspect of the present disclosure, a communication resource allocation device is further provided and includes: a receiving unit, configured to receive a first signaling and a second signaling transmitted by a base station; an acquisition unit, configured to acquire, according to the first signaling, granularity information of time-frequency resource and a frequency domain resource range determined by the base station according to a service type of a current service, and acquire, according to the second signaling, frequency domain resource selected and allocated by the base station in the frequency domain resource range; a determination unit, configured to determine, according to the granularity information of the time-frequency and the frequency domain resource, resource block information allocated by the base station and used for processing the current service; and a processing unit, configured to process the current service based on the resource block information.

In the above-mentioned technical solution, optionally, the first signaling is an RRC signaling, and the second signaling is a DCI signaling.

According to a fifth aspect of the present disclosure, a base station is further provided and includes the communication resource allocation device as described in the third aspect.

According to a sixth aspect of the present disclosure, a terminal is further provided and includes the communication resource allocation device as described in the fourth aspect.

DETAILED DESCRIPTION

In order to more clearly understand the above objectives, features and advantages of the present disclosure, the present disclosure will be further described in detail in the following with reference to the accompanying drawings and embodiments. It should be noted that, embodiments of the present disclosure and features of the embodiments can be combined with each other, when there is no conflict.

Various details are described in the following descriptions for better understanding of the present disclosure, however, the present disclosure may also be implemented in other ways other than those described herein, accordingly, the scope of the present disclosure is not limited by the specific embodiments disclosed below.

Figure 1:
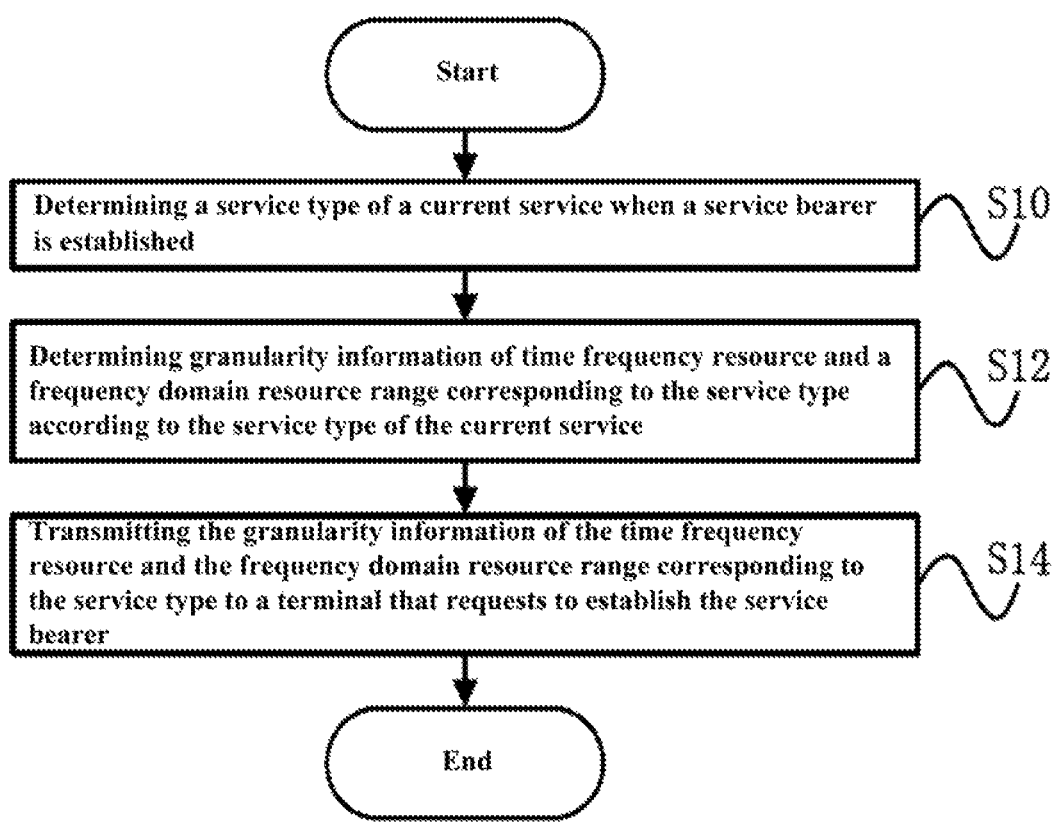
FIG. 1 shows a schematic flow chart of a communication resource allocation method according to a first embodiment of the present disclosure.

FIG. 1 shows a schematic flow chart of a communication resource allocation method according to a first embodiment of the present disclosure. The communication resource allocation method can be performed by a base station.

As shown in FIG. 1, the communication resource allocation method according to the first embodiment of the present disclosure includes:

Step S10, determining a service type of a current service when a service bearer is established.

In this step, the service type of the current service includes, but is not limited to: an LTE service, an eMBB service, an mMTC service and a URLLC service.

Step S12, determining granularity information of time-frequency resource and a frequency domain resource range corresponding to the service type according to the service type of the current service.

The granularity information of the time-frequency resource includes a granularity of the frequency domain resource and a granularity of time domain resource. The granularity of the frequency domain resource is a subcarrier spacing, and the granularity of the time domain resource is a transmission time interval.

Step S14, transmitting the granularity information of the time-frequency resource and the frequency domain resource range corresponding to the service type to a terminal that requests to establish the service bearer.

In one embodiment of the present disclosure, the step S12 specifically includes: determining the granularity of the time domain resource to be 1 ms, the granularity of the frequency domain resource to be 15 KHz, and the frequency domain resource range to be the whole or a part of a range of an entire bandwidth, when the current service is an LTE service.

In one embodiment of the present disclosure, the step S12 specifically includes: determining the granularity of the time domain resource to be $T_1$, the granularity of the frequency domain resource to be $F_1$, and the frequency domain resource range to be the whole or a part of the range of the entire bandwidth, when the current service is an eMBB service, wherein $T_1 \leq 1$ ms, and $F_1 > 15$ KHz.

In the embodiment, since the main indicators of the eMBB service are high bandwidth and low latency; in order to satisfy the requirement of the eMBB service, the granularity of the frequency domain resource thereof is larger than the granularity of frequency domain resource of the LTE service, namely is larger than 15 KHz; and the granularity of time domain resource thereof is less than or equal to the granularity of time domain resource of the LTE service, namely is less than or equal to 1 ms.

In one embodiment of the present disclosure, the step S12 specifically includes: determining the granularity of the time domain resource to be $T_2$, the granularity of the frequency domain resource to be $F_2$, and the frequency domain resource range to be a part of the range of the entire bandwidth, when the current service is an mMTC service, wherein $T_2 \geq 1$ ms, and $F_2 \leq 15$ KHz.

In the embodiment, as the mMTC service requires narrow band services, and requires a battery having an extremely long service life; such a service requires a frequency domain having smaller granularity and a time domain resources having wider granularity. Therefore, the granularity of the frequency domain resource thereof is less than or equal to the granularity of frequency domain resource of the LTE service, namely is less than or equal to 15 KHz; and the granularity of time domain resource thereof is larger than or equal to the granularity of time domain resource of the LTE service, namely is larger than or equal to 1 ms.

In one embodiment of the present disclosure, the step S12 specifically includes: determining the granularity of the time domain resource to be $T_3$, the granularity of the frequency domain resource to be $F_3$, and the frequency domain resource range to be a part of the range of the entire bandwidth, when the current service is a URLLC service, wherein $T_3 \ll 1$ ms, and $F_3 \geq 15$ KHz.

In the embodiment, since the URLLC service is an ultra-reliable and low latency service, and requires reduction in the latency influence caused by the uplink scheduling latency and the HARQ feedback latency. Therefore, in order to satisfy the requirement of the URLLC service, the granularity of the frequency domain resource thereof is larger than or equal to the granularity of frequency domain resource of the LTE service, namely is larger than or equal to 15 KHz; and the granularity of time domain resource thereof is much less than the granularity of the time domain resource of the LTE service, namely is much less than 1 ms.

In one embodiment of the present disclosure, the step S14 specifically includes: dividing the entire bandwidth into a plurality of frequency domain resource ranges having equal bandwidths, and indicating to the terminal a start point of the frequency domain resource range corresponding to the service type on the entire bandwidth. The plurality of frequency domain resource ranges may not be overlapped or may be partially overlapped.

In the embodiment, since the entire bandwidth is already divided into the plurality of frequency domain resource ranges having equal bandwidths, thus, when a base station indicates the frequency domain resource range corresponding to the service type, the base station merely needs to indicate the start point to the terminal, and then the terminal can determine the frequency domain resource range corresponding to the service type according to the start point and a bandwidth of each frequency domain resource range divided on the entire bandwidth. Alternatively, the base station can also indicate a start point and an end point. When the base station indicates to the terminal a start point and an end point of the frequency domain resource range corresponding to the service type on the entire bandwidth, the base station can indicate a plurality of consecutive resource blocks on the entire bandwidth to the terminal, or can indicate a plurality of non-consecutive resource blocks.

In another embodiment of the present disclosure, the step S14 specifically includes: dividing the entire bandwidth into a plurality of frequency domain resource ranges having unequal bandwidths, and indicating to the terminal a bandwidth size and a start point of the frequency domain resource range corresponding to the service type on the entire bandwidth; or indicating to the terminal a start point and an end point of the frequency domain resource range corresponding to the service type on the entire bandwidth. The plurality of frequency domain resource ranges may not be overlapped or may be partially overlapped.

In the embodiment, since the entire bandwidth is divided into the plurality of frequency domain resource ranges having unequal bandwidths, therefore, when the base station indicates to the terminal the frequency domain resource range corresponding to the service type, the base station needs to indicate the bandwidth size and the start point of the frequency domain resource range on the entire bandwidth, or indicating the start point and the end point thereof on the entire bandwidth. When indicating to the terminal the start point and the end point of the frequency domain resource range corresponding to the service type on the entire bandwidth, the base station can indicate to the terminal a plurality of consecutive resource blocks on the entire bandwidth, or can indicate a plurality of non-consecutive resource blocks.

In any one of the above-mentioned technical solutions, optionally, the frequency domain resource range includes a first frequency domain range for transmitting a reference signal and a second frequency domain range for transmitting data, the first frequency domain range and the second frequency domain range may not be overlapped, may be partially overlapped, or may be completely overlapped.

In the technical solution, the frequency domain resource range corresponding to the service type indicated to the terminal by the base station includes a frequency domain range (i.e., the first frequency domain range) for transmitting a reference signal, and a frequency domain range (i.e., the second frequency domain range) for transmitting data. The first and the second frequency domain ranges may not be overlapped, may be partially overlapped, or may be completely overlapped. The reference signal refers to a reference signal for synchronization and RRM measurement.

In any one of the above-mentioned technical solutions, optionally, the granularity information of the time-frequency resource and the frequency domain resource range corresponding to the service type are transmitted to the terminal that requests to establish the service bearer via an RRC signaling.

In any one of the above-mentioned technical solutions, optionally, the method further includes: indicating, via a DCI signaling, resource block information that is scheduled and allocated to use when the terminal processes the current service. The resource block information includes frequency domain resource selected from the frequency domain resource range corresponding to the service type.

In the technical solution as shown in FIG. 1, by determining the service type of the current service, determining the granularity information of the time-frequency resource and the frequency domain resource range corresponding to the service type, and transmitting the determined the granularity information of the time-frequency resource and the frequency domain resource range to the terminal that requests to establish the service bearer, the present disclosure can flexibly and correspondingly adjust the granularities of the time-frequency resource and the frequency domain resource range according to different types of services, can avoid the large uplink scheduling latency and long HARQ feedback latency due to the adoption of fixed granularities of the time-frequency resource, and can avoid the problem that the service requirement in the 5G communication scenario cannot be satisfied due to the adoption of a small frequency domain resource range (carrier bandwidth), thus the resource scheduling can flexibly adapt to different types of services, thereby facilitating the improvement of resource utilization ratio.

Figure 2:
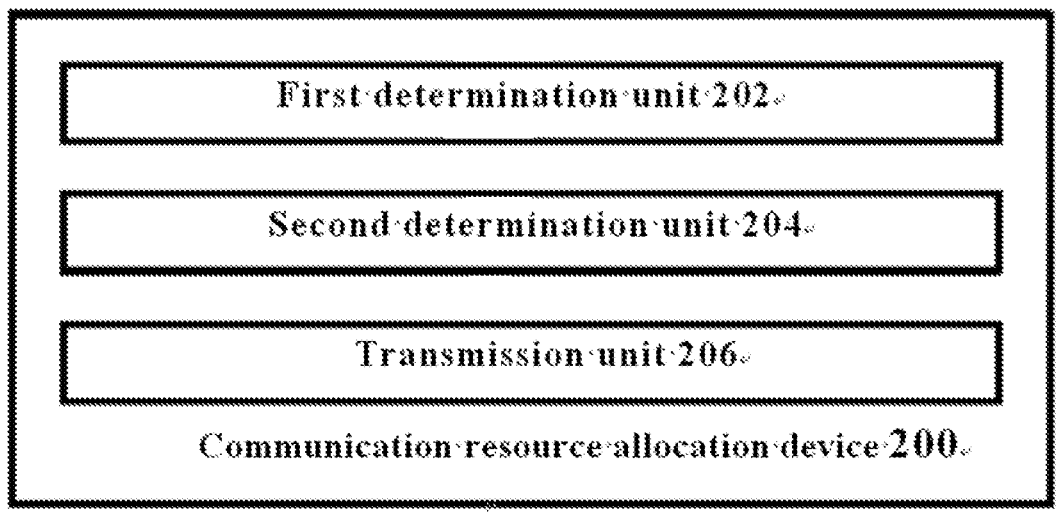
FIG. 2 shows a schematic block diagram of a communication resource allocation device according to the first embodiment of the present disclosure.

FIG. 2 shows a schematic block diagram of a communication resource allocation device according to the first embodiment of the present disclosure.

As shown in FIG. 2, according to the first embodiment of the present disclosure, the communication resource allocation device 200 includes a first determination unit 202, a second determination unit 204 and a transmission unit 206.

The first determination unit 202 is configured to determine a service type of a current service when a service bearer is established; the second determination unit 204 is configured to determine granularity information of time-frequency resource and a frequency domain resource range corresponding to the service type according to the service type of the current service determined by the first determination unit 202; and the transmission unit 206 is configured to transmit the granularity information of the time-frequency resource and the frequency domain resource range corresponding to the service type determined by the second determination unit 204, to a terminal that requests to establish the service bearer.

In the technical solution, by determining the service type of the current service, determining the granularity information of the time-frequency resource and the frequency domain resource range corresponding to the service type, and transmitting the determined granularity information of the time-frequency resource and the frequency domain resource range to the terminal that requests to establish the service bearer, the present disclosure can flexibly adjust the granularities of the time-frequency resource and the frequency domain resource range correspondingly according to different types of services, can avoid the large uplink scheduling latency and long HARQ feedback latency due to the adoption of fixed granularities of time-frequency resource, and can avoid a problem that the service requirement in the 5G communication scenario cannot be satisfied due to the adoption of a small frequency domain resource range (carrier bandwidth), thus the resource scheduling can flexibly adapt to different types of services, thereby facilitating the improvement of resource utilization ratio.

The granularity information of the time-frequency resource includes a granularity of the frequency domain resource and a granularity of time domain resource; the granularity of the frequency domain resource is a subcarrier spacing; and the granularity of time domain resource is a transmission time interval.

In the above-mentioned technical solution, optionally, the second determination unit 204 is specifically configured to: determine the granularity of the time domain resource to be 1 ms, the granularity of the frequency domain resource to be 15 KHz, and the frequency domain resource range to be the whole or a part of a range of an entire bandwidth, when the current service is an LTE service.

In any one of the above-mentioned technical solutions, optionally, the second determination unit 204 is specifically configured to: determine the granularity of the time domain resource to be $T_1$, the granularity of the frequency domain resource to be $F_1$, and the frequency domain resource range to be the whole or a part of the range of the entire bandwidth, when the current service is an eMBB service, wherein $T_1 \leq 1$ ms, and $F_1 > 15$ KHz.

In the technical solution, since the main indicators of the eMBB service are high bandwidth and low latency; in order to satisfy the requirement of the eMBB service, the granularity of the frequency domain resource thereof is larger than the granularity of frequency domain resource of the LTE service, namely is larger than 15 KHz; and the granularity of time domain resource thereof is less than or equal to the granularity of time domain resource of the LTE service, namely is less than or equal to 1 ms.

In any one of the above-mentioned technical solutions, optionally, the second determination unit 204 is specifically configured to: determine the granularity of time domain resource to be $T_2$, the granularity of the frequency domain resource to be $F_2$, and the frequency domain resource range to be a part of the range of the entire bandwidth, when the current service is an mMTC service, wherein $T_2 \geq 1$ ms, and $F_2 \leq 15$ KHz.

In the technical solution, since the mMTC service requires narrow band services, and requires a battery having an extremely long service life; such a service requires a frequency domain having smaller granularity and a time domain resources having wider granularity. Therefore, the granularity of the frequency domain resource thereof is less than or equal to the granularity of frequency domain resource of the LTE service, namely is less than or equal to 15 KHz; and the granularity of time domain resource thereof is larger than or equal to the granularity of time domain resource of the LTE service, namely is larger than or equal to 1 ms.

In any one of the above-mentioned technical solutions, optionally, the second determination unit 204 is specifically configured to: determine the granularity of the time domain resource to be $T_3$, the granularity of the frequency domain resource to be $F_3$, and the frequency domain resource range to be a part of the range of the entire bandwidth, when the current service is a URLLC service, wherein $T_3 \ll 1$ ms, and $F_3 \geq 15$ KHz.

In the technical solution, since the URLLC service is an ultra-reliable and low latency service, and requires reduction in the latency influence caused by the uplink scheduling latency and the HARQ feedback latency. Therefore, in order to satisfy the requirement of the URLLC service, the granularity of the frequency domain resource thereof is larger than or equal to the granularity of frequency domain resource of the LTE service, namely is larger than or equal to 15 KHz; and the granularity of time domain resource thereof is much less than the granularity of the time domain resource of the LTE service, namely is much less than 1 ms.

In one embodiment of the present disclosure, the transmission unit 206 is specifically configured to: divide the entire bandwidth into a plurality of frequency domain resource ranges having equal bandwidths, and indicating to the terminal a start point of the frequency domain resource range corresponding to the service type on the entire bandwidth. The plurality of frequency domain resource ranges may not be overlapped, or may be partially overlapped.

In the embodiment, since the entire bandwidth is already divided into the plurality of frequency domain resource ranges having equal bandwidths, therefore, when a base station indicates to the terminal the frequency domain resource range corresponding to the service type, the base station merely needs to indicate the start point. The terminal can determine the frequency domain resource range corresponding to the service type according to the start point and a bandwidth of each frequency domain resource range divided on the entire bandwidth. Alternatively, the base station can also indicate the start point and the end point. When the base station indicates to the terminal the start point and the end point of the frequency domain resource range corresponding to the service type on the entire bandwidth, the base station can indicate to the terminal a plurality of consecutive resource blocks on the entire bandwidth, or can indicate a plurality of non-consecutive resource blocks.

In another embodiment of the present disclosure, the transmission unit 206 is specifically configured to: divide the entire bandwidth into a plurality of frequency domain resource ranges having unequal bandwidths, and indicating to the terminal a bandwidth size and a start point of the frequency domain resource range corresponding to the service type on the entire bandwidth, or indicating to the terminal a start point and an end point of the frequency domain resource range corresponding to the service type on the entire bandwidth. The plurality of frequency domain resource ranges may not be overlapped or may be partially overlapped.

In the embodiment, since the entire bandwidth is divided into the plurality of frequency domain resource ranges having unequal bandwidths, when the base station indicates to the terminal the frequency domain resource range corresponding to the service type, the base station needs to indicate the bandwidth size and the start point of the frequency domain resource range on the entire bandwidth, or indicating the start point and the end point thereof on the entire bandwidth. When indicating to the terminal the start point and the end point of the frequency domain resource range corresponding to the service type on the entire bandwidth, the base station can indicate to the terminal a plurality of consecutive resource blocks on the entire bandwidth, or can indicate a plurality of non-consecutive resource blocks.

In any one of the above-mentioned technical solutions, optionally, the frequency domain resource range includes a first frequency domain range for transmitting a reference signal and a second frequency domain range for transmitting data, the first frequency domain range and the second frequency domain range may not be overlapped, may be partially overlapped, or may be completely overlapped.

In the technical solution, the frequency domain resource range corresponding to the service type indicated to the terminal by the base station includes a frequency domain range (i.e., the first frequency domain range) for transmitting a reference signal, and a frequency domain range (i.e., the second frequency domain range) for transmitting data. The first and the second frequency domain ranges may not be overlapped, may be partially overlapped, or may be completely overlapped. The reference signal refers to a reference signal for synchronization and RRM measurement.

In any one of the above-mentioned technical solutions, optionally, the granularity information of the time-frequency resource and the frequency domain resource range corresponding to the service type are transmitted to the terminal that requests to establish the service bearer via an RRC signaling.

In any one of the above-mentioned technical solutions, optionally, the transmission unit 206 is further configured to: indicate, via a DCI signaling, resource block information that is scheduled and allocated to use when the terminal processes the current service, the resource block information includes frequency domain resource selected from the frequency domain resource range corresponding to the service type.

Figure 3:
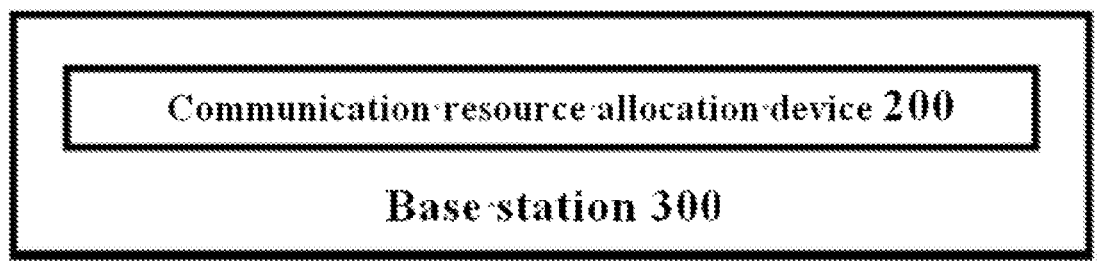
FIG. 3 shows a schematic block diagram of a base station according to an embodiment of the present disclosure.

FIG. 3 shows a schematic block diagram of a base station according to the embodiment of the present disclosure.

As shown in FIG. 3, according to the embodiment of the present disclosure, the base station 300 includes the communication resource allocation device 200 as shown in FIG. 2.

Figure 4:
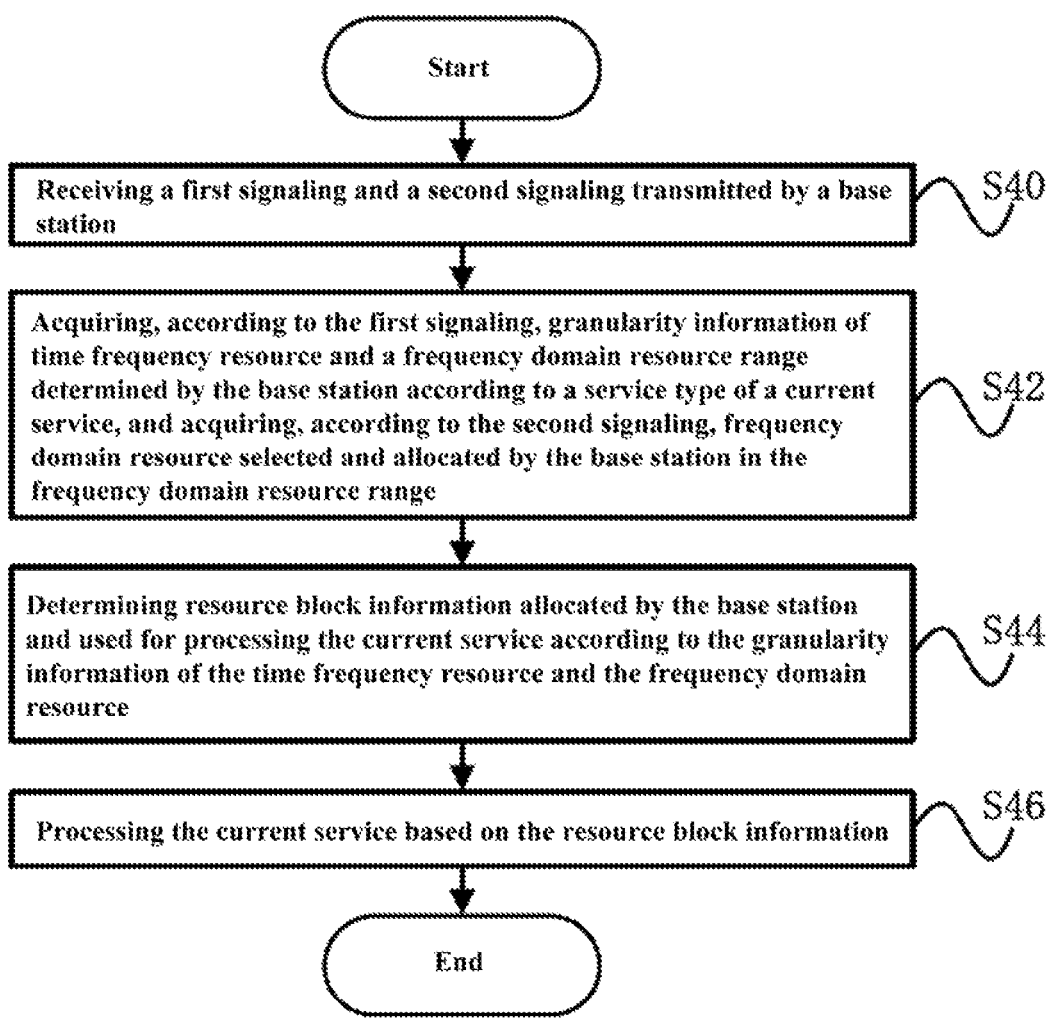
FIG. 4 shows a schematic flow chart of a communication resource allocation method according to a second embodiment of the present disclosure.

FIG. 4 shows a schematic flow chart of a communication resource allocation method according to a second embodiment of the present disclosure. The communication resource allocation method can be performed by a terminal.

As shown in FIG. 4, the communication resource allocation method according to the second embodiment of the present disclosure includes:

Step S40, receiving a first signaling and a second signaling transmitted by a base station;

Step S42, acquiring, according to the first signaling, granularity information of time-frequency resource and a frequency domain resource range determined by the base station according to a service type of a current service, and acquiring, according to the second signaling, frequency domain resource selected and allocated by the base station in the frequency domain resource range.

Step S44, determining, according to the granularity information of the time-frequency and the frequency domain resource, resource block information allocated by the base station and used for processing the current service.

Step S46, processing the current service based on the resource block information.

The first signaling is an RRC signaling, and the second signaling is a DCI signaling.

In the technical solution as shown in FIG. 4, by acquiring, according to the first signaling, the granularity information of the time-frequency resource and the frequency domain resource range determined by the base station according to the service type of the current service, the present disclosure can flexibly adjust the granularities of the time-frequency resource and the frequency domain resource range correspondingly according to different types of services, can avoid the large uplink scheduling latency and long HARQ feedback latency due to the adoption of fixed granularities of the time-frequency resource, and can avoid the problem that the service requirement in the 5G communication scenario cannot be satisfied due to the adoption of a small frequency domain resource range (carrier bandwidth), thus the resource scheduling can flexibly adapt to different types of services, thereby facilitating the improvement of resource utilization ratio. Moreover, by acquiring, according to the second signaling, a frequency domain resource selected and allocated by the base station in the frequency domain resource range, the present disclosure can schedule the terminal to process the current service.

Figure 5:
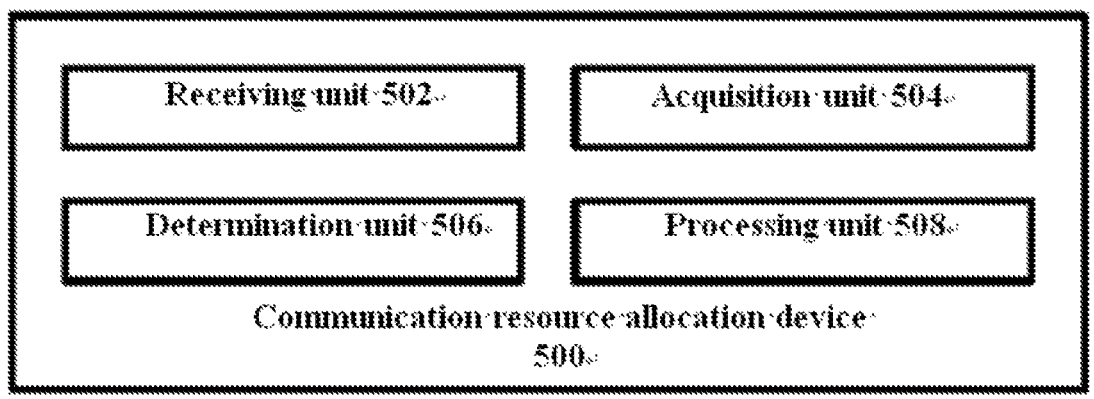
FIG. 5 shows a schematic block diagram of a communication resource allocation device according to the second embodiment of the present disclosure.

FIG. 5 shows a schematic block diagram of a communication resource allocation device according to the second embodiment of the present disclosure.

As shown in FIG. 5, according to the second embodiment of the present disclosure, the communication resource allocation device 500 includes a receiving unit 502, an acquisition unit 504, a determination unit 506 and a processing unit 508.

The receiving unit 502 is configured to receive a first signaling and a second signaling transmitted by a base station; the acquisition unit 504 is configured to acquire, according to the first signaling, granularity information of time-frequency resource and a frequency domain resource range determined by the base station according to a service type of a current service, and acquire, according to the second signaling, frequency domain resource selected and allocated by the base station in the frequency domain resource range; the determination unit 506 is configured to determine, according to the granularity information of the time-frequency and the frequency domain resource, resource block information allocated by the base station and used for processing the current service; and the processing unit 508 is configured to process the current service based on the resource block information.

The first signaling is an RRC signaling, and the second signaling is a DCI signaling.

In the technical solution, by acquiring, according to the first signaling, the granularity information of the time-frequency resource and the frequency domain resource range determined by the base station according to the service type of the current service, the present disclosure can flexibly adjust the time-frequency resource granularities and the frequency domain resource range correspondingly according to different types of services, can avoid the large uplink scheduling latency and long HARQ feedback latency due to the adoption of fixed granularities of the time-frequency resource, and can avoid the problem that the service requirement in the 5G communication scenario cannot be satisfied due to the adoption of a small frequency domain resource range (carrier bandwidth), thus the resource scheduling can flexibly adapt to different types of services, thereby facilitating the improvement of resource utilization ratio. Moreover, by acquiring, according to the second signaling, the frequency domain resource selected and allocated by the base station in the frequency domain resource range, the present disclosure can schedule the terminal to process the current service.

Figure 6:
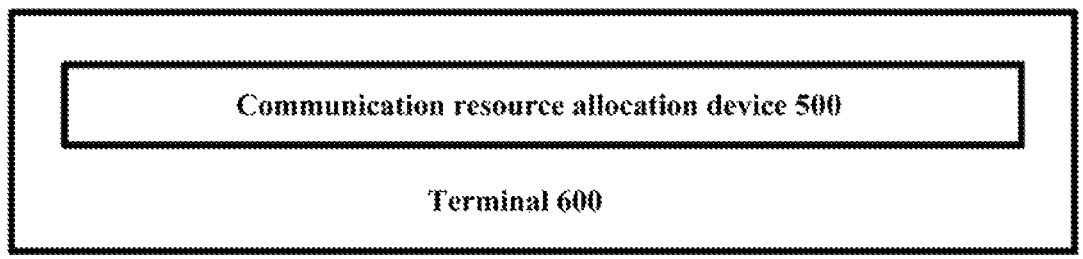
FIG. 6 shows a schematic block diagram of a terminal according to an embodiment of the present disclosure.

FIG. 6 shows a schematic block diagram of a terminal according to the embodiment of the present disclosure.

As shown in FIG. 6, according to the embodiment of the present disclosure, a terminal 600 includes the communication resource allocation device 500 as shown in FIG. 5.

Figure 8:
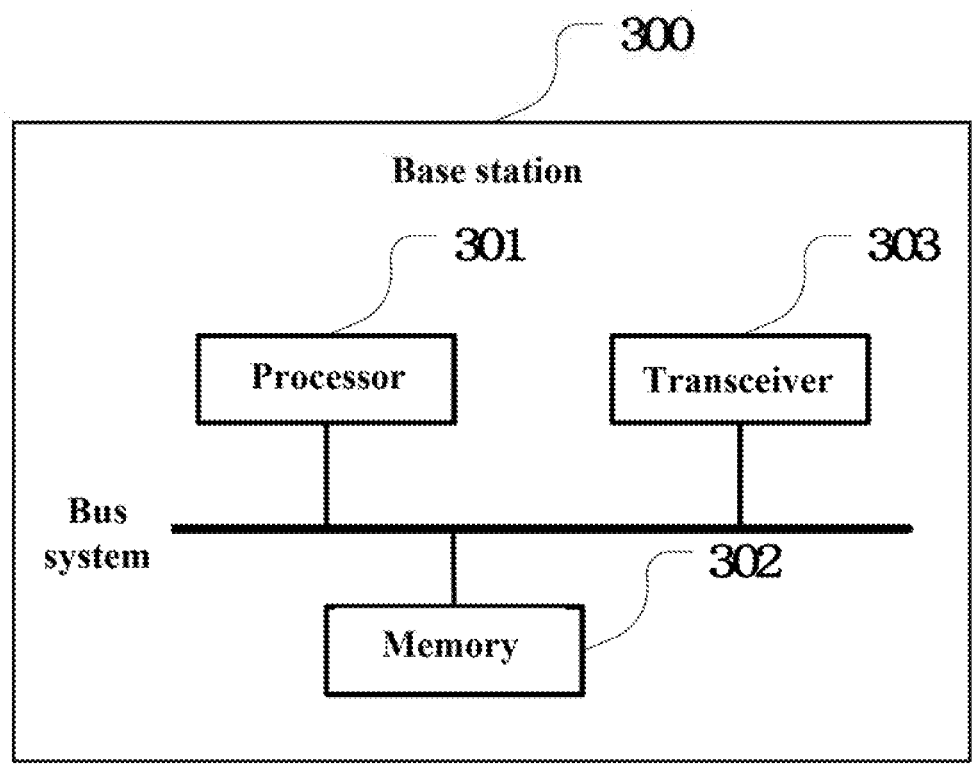
FIG. 8 shows a structural diagram of the base station according to an embodiment of the present disclosure.

FIG. 8 shows a structural diagram of the base station according to the embodiment of the present disclosure.

As shown in FIG. 8, a structural schematic view of a base station is provided in an embodiment of the present disclosure. In the embodiment of the present disclosure, the base station 300 includes a processor 301, a memory 302 and a transceiver 303. The transceiver 303 is used to receive and transmit data from/to an external device. A number of the processor 301 in the base station 300 can be one or more. In some embodiments of the present disclosure, the processor 301, the memory 302 and the transceiver 303 can be connected via a bus system or by other means. The base station 300 can be used to execute the method as shown in FIG. 1.

The memory 302 stores program codes, and the processor 301 can invoke the program codes stored in the memory 302 via the bus system to execute relevant functions. In one embodiment, the units in FIG. 2 (for example, the first determination unit 202, the second determination unit 204, the transmission unit 206 and the like) are program codes stored in the memory 302, and can be executed by the processor 301 to execute the functions of the units to implement the communication resource allocation.

Specifically, the processor 301 determines a service type of a current service when a service bearer is established; determines granularity information of time-frequency resource and a frequency domain resource range corresponding to the service type according to the service type of the current service; and transmits the granularity information of the time-frequency resource and the frequency domain resource range corresponding to the service type to a terminal that requests to establish the service bearer.

In another embodiment, the processor 301 determines a granularity of time domain resource to be 1 ms, a granularity of a frequency domain resource to be 15 KHz, and a frequency domain resource range to be the whole or a part of a range of an entire bandwidth, when the current service is an LTE service.

In another embodiment, the processor 301 determines the granularity of time domain resource to be $T_1$, the granularity of the frequency domain resource to be $F_1$, and the frequency domain resource range to be the whole or a part of the range of the entire bandwidth, when the current service is an eMBB service, wherein $T_1 \leq 1$ ms, and $F_1 > 15$ KHz.

In another embodiment, the processor 301 determines the granularity of the time domain resource to be $T_2$, the granularity of the frequency domain resource to be $F_2$, and the frequency domain resource range to be a part of the range of the entire bandwidth, when the current service is an mMTC service, wherein $T_2 \geq 1$ ms, and $F_2 \leq 15$ KHz.

In another embodiment, the processor 301 determines the granularity of the time domain resource to be $T_3$, the granularity of the frequency domain resource to be $F_3$, and the frequency domain resource range to be a part of the range of the entire bandwidth, when the current service is a URLLC service, wherein $T_3 \ll 1$ ms, and $F_3 \geq 15$ KHz.

In another embodiment, the processor 301 divides the entire bandwidth into a plurality of frequency domain resource ranges having equal bandwidths, and indicates to the terminal a start point of the frequency domain resource range corresponding to the service type on the entire bandwidth; or divides the entire bandwidth into a plurality of frequency domain resource ranges having unequal bandwidths, and indicate, for the terminal, a bandwidth size and a start point of the frequency domain resource range corresponding to the service type on the entire bandwidth, or indicate to the terminal a start point and an end point of the frequency domain resource range corresponding to the service type on the entire bandwidth.

In another embodiment, the plurality of frequency domain resource ranges may not be overlapped, or may be partially overlapped.

In another embodiment, the frequency domain resource range includes a first frequency domain range for transmitting a reference signal and a second frequency domain range for transmitting data, the first frequency domain range and the second frequency domain range may not be overlapped, may be partially overlapped, or may be completely overlapped.

In another embodiment, the processor 301 transmits the granularity information of the time-frequency resource and the frequency domain resource range corresponding to the service type to a terminal that requests to establish the service bearer, via an RRC signaling.

In another embodiment, the processor 301 indicates, via a DCI signaling, the resource block information that is scheduled and allocated to use when the terminal processes the current service, the resource block information includes the frequency domain resource selected from the frequency domain resource range corresponding to the service type.

Figure 9:
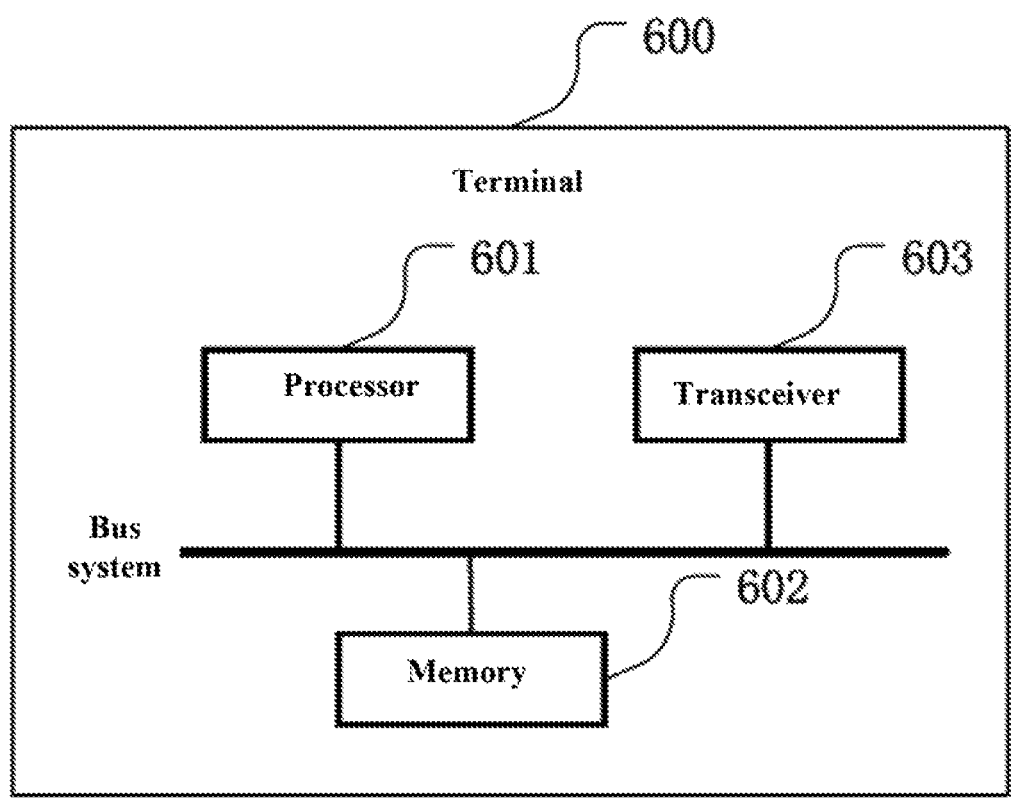
FIG. 9 shows a structural diagram of the terminal according to an embodiment of the present disclosure.

FIG. 9 shows a structural diagram of the terminal according to the embodiment of the present disclosure.

As shown in FIG. 9, a structural schematic view of a terminal is provided in an embodiment of the present disclosure. In the embodiment of the present disclosure, the terminal 600 includes a processor 601, a memory 602 and a transceiver 603. The transceiver 603 is used to receive or transmit data from/to an external device. A number of the processor 601 in the terminal 600 can be one or more. In some embodiments of the present disclosure, the processor 601, the memory 602 and the transceiver 603 can be connected via a bus system or by other means. The terminal 600 can be used to execute the method as shown in FIG. 4.

The memory 602 stores program codes; and the processor 601 can invoke the program code stored in the memory 602 via the bus system to execute relevant functions. In one embodiment, the units in FIG. 5 (for example, the receiving unit 502, the acquisition unit 504, the determination unit 506, the processing unit 508 and the like) are program codes stored in the memory 602, and can be executed by the processor 601 to realize the functions of the units to implement the communication resource allocation.

Specifically, the processor 601: receives a first signaling and a second signaling transmitted by a base station; acquires, according to the first signaling, granularity information of time-frequency resource and a frequency domain resource range determined by the base station according to the service type of the current service, and acquires, according to the second signaling, a frequency domain resource selected and allocated by the base station in the frequency domain resource range; determines, according to the time-frequency granularity information and the frequency domain resource, resource block information allocated by the base station and used for processing the current service; and processes the current service based on the resource block information.

In one embodiment, the first signaling is an RRC signaling, and the second signaling is a DCI signaling.

In conclusion, the technical solution of the present disclosure mainly provides a novel communication resource solution, which can adopt corresponding granularities of time-frequency resource and frequency domain resource ranges according to different types of services, and can satisfy the 5G communication requirements.

The method specifically includes the following aspects:

First, when each service bearer of a terminal is established, a base station transmits information of the service bearer to the terminal via an RRC signaling, the information includes following contents:

1, Subcarrier spacing, namely a granularity of frequency domain resource;

2, Transmission time interval, namely a granularity of time domain resource, the transmission time interval in the LTE system is generally 1 ms; and 3. An allocable RB range, which mainly refers to a frequency domain resource range.

In the 5G communication, a bandwidth of one carrier may be large, such as 80 MHz or 100 MHz. Therefore, if the RB range is not limited in the RRC signaling, then overhead of the DCI signaling would be large when a specified RB allocation is indicated to the terminal subsequently. The indication of the allocable RB range has another meaning, namely system information related to a radio service bearer, a reference signal and a synchronization signal and the like, are also transmitted in the RB range. That is, the radio service bearer can be correctly processed by performing a detection in the RB range. Certainly, the RB ranges for transmitting a reference signal and data can be different.

In the above-mentioned three pieces of information notified to the terminal via the RRC signaling, the subcarrier spacing and the transmission time interval are used for the radio service bearer; that is, these two parameters do not change as long as the service bearer is one. The last RB range can be changed according to an overall service situation, and can also be semi-statically adjusted via the RRC signaling.

Second, for different types of services, values of the above-mentioned three parameters are specifically as follows:

1, for a conventional LTE service, the values of the three above-mentioned parameters can be determined sequentially:

LTE_Subcarr Space=15 KHz;

LTE_tti=1 ms;

LTE RB is the whole or a part of a range of an entire bandwidth range.

2, for an eMBB service, the three parameters thereof are compared with the three parameters of the LTE service as follows:

eMBB_Subcarr Space>LTE_Subcarr Space;
eMBB_tti≤LTE_tti;
eMBB_RB may be the entire bandwidth or a part of the entire bandwidth.

3. for an mMTC service, the three parameters thereof are compared with the three parameters of the LTE service as follows:
mMTC_Subcarr Space≤LTE_Subcarr Space;
mMTC_tti≥LTE_tti;
mMTC_RB is a very small part of the entire bandwidth, such as 180 KHz.

4. for a URLLC service, the three parameters thereof are compared with the three parameters of the LTE service as follows:
URLLC_Subcarr Space≥LTE_Subcarr Space;
URLLC_tti<<LTE_tti, namely the TTI of the URLLC is much less than the TTI of the LTE;
URLLC_RB is a very small part of the entire bandwidth.

Third, when the base station transmits the information of the service bearer to the terminal via the RRC signaling, the RB range indication method is specifically as follows:

The base station can firstly indicate an approximate position of the RB range on the entire bandwidth via the RRC signaling. In order to ensure backward compatibility and support the MTC service (a narrow band service), the values of the RB ranges on the entire bandwidth should be uniform. Therefore, an RB_baseline (RB reference) can be selected, a value of the RB_baseline is the same as the RB value of the LTE, i.e., 180 KHz. When the RB range is indicated via the RRC signaling, the RB range can be indicated by taking the RB_baseline as a granularity. A specific indication method is as follows:

1, when bandwidths of a plurality of frequency domain ranges divided on the entire bandwidth are all the same, for example, a bandwidth of each frequency domain range is 20 Mhz, only a start point of the RB range is required to be indicated;

2, when the bandwidths of the plurality of frequency domain ranges divided on the entire bandwidth are uncertain, the start point of the RB range and a bandwidth size are both required to be indicated, or the start point and end point of the RB range are required to be indicated.

Figure 7:
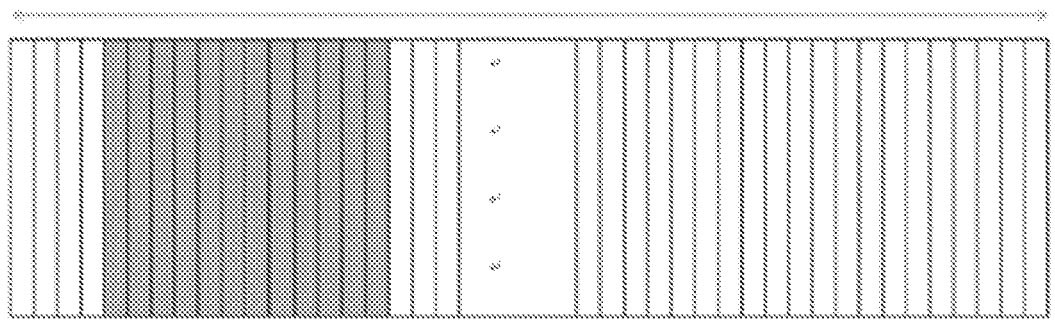
FIG. 7 shows a schematic view of indicating a RB range via an RRC signaling according to an embodiment of the present disclosure.

For the above-mentioned two indication methods, if the RRC is used for different services, that is the same terminal has a plurality of services, then the frequency domain resource area indicated by the RRC signaling may be independent. In addition, the above-mentioned plurality of frequency domain ranges may be completely not overlapped, or may be partially overlapped. Furthermore, the indicated RB range can be a consecutive bandwidth (as shown in FIG. 7), or can be a plurality of non-consecutive bandwidths.

Fourth, after the base station indicates the RB range to the terminal via the RRC signaling, the base station indicates specific RB allocation to the terminal via the DCI signaling.

Specifically, for example, for the LTE service, if the RB range indicated by the base station via the RRC signaling includes 110 RBs (i.e., 20 MHz), then the DCI signaling can allocate a number N of the 110 RBs to the terminal.

For the eMBB service, if the RB range indicates that the entire bandwidth is 80 MHz, then the DCI signal can allocate a number M of eMBB_RBs of the 80 MHz to the terminal, eMBB_RB is decided by the subcarrier spacing and tti of the eMBB; and a size of the eMBB_RB may be multiple times of the RB_baseline, which is 180 KHz.

For the mMTC service, if the RB range indicates an RB therein, then the DCI signaling needs to indicate which mMTC_RBs therein are required to be allocated to the terminal. mMTC_RB is decided by the subcarrier spacing and tti of the mMTC, for example, similarly in an NB-IoT, the DCI signaling indicates which 15 KHz are allocated to the terminal.

The RB range is used for transmitting a reference signal and data. The RB ranges for transmitting a reference signal and transmitting data can be the same, or can be different. If the RB ranges are different, the RB ranges are required to be divided into an RB range for transmitting the reference signal and an RB range for transmitting the data. The RB range for transmitting the reference signal is mainly used to perform uplink and downlink synchronization and RRM (radio resource management) measurement. The RB range for transmitting the data is mainly used to transmit and receive data. For the same terminal, the RB range for transmitting the reference signal and the RB range for transmitting the data may not be overlapped, may be partially overlapped, or may be completely overlapped. Alternatively, one range can include the other range.

Moreover, for the frequency domain resources beyond the above-mentioned two ranges (namely the RB range for transmitting the reference signal and the RB range for transmitting the data), the terminal does not need to measure the two ranges, and likewise does not need to monitor Physical Downlink Control Channel (PDCCH).

In addition, for different types of services, the DCI signal can use different bit numbers and indication methods while indicating.

Fifth, in a processing procedure of the terminal:
1, receiving an RRC signaling and a DCI signaling transmitted by the base station;
2, acquiring, from the RRC signaling, the RB range indicated by the base station, and the subcarrier spacing and tti of the current service. For example, in case of an eMBB service, eMBB_RB is used as a granularity.
3. determining that the specific frequency domain resources in the RB range are allocated to the terminal for use according to an indication of the DCI signaling. For example, it can be determined that which eMBB_RB values are allocated to the terminal.
4, processing the current service based on the determined time-frequency resources.

Therefore, by designing a new RRC signaling to indicate the subcarrier spacing, the transmission time interval and the used RB range, corresponding to different services, the technical solution of the present disclosure can better schedule resources for the services, and can reduce overhead of the DCI signaling.

With reference to the accompanying drawings, the technical solution of the present disclosure is described in detail above. The present disclosure provides a novel communication resource allocation solution, which can flexibly adjust time-frequency resource granularities and frequency domain resource range correspondingly according to different types of services, thus the resource scheduling can flexibly adapt to different types of services, thereby facilitating the improvement of resource utilization ratio.

The above mentioned descriptions are merely preferred embodiments of the present disclosure, and are not to limit the present disclosure. For persons skilled in the art, various changes or modifications may be made to the present disclosure. Any modification, equivalent, and improvement without departing from the spirit and scope of the present disclosure, should be within the protection scope of the present disclosure.

What is claimed is:

1. A communication resource allocation method, comprising:
   determining a service type of a current service when a service bearer is established;
   determining granularity information of time-frequency resource and a frequency domain resource range corresponding to the service type according to the service type of the current service, wherein the frequency domain resource range comprises a first frequency domain range for transmitting a reference signal and a second frequency domain range for transmitting data, the reference signal is used for synchronization and radio resource management (RRM) measurement, the granularity information of the time-frequency resource is unchangeable, and the frequency domain resource range is semi-statically adjustable; and
   transmitting the granularity information of the time-frequency resource and the frequency domain resource range corresponding to the service type, via a Radio Resource Control (RRC) signaling, to a terminal that requests to establish the service bearer, wherein an approximate position of the frequency domain resource range in an entire bandwidth is indicated via the RRC signaling.

2. The communication resource allocation method of claim 1, wherein determining the granularity information of the time-frequency resource and the frequency domain resource range corresponding to the service type according to the service type of the current service, comprises:
   determining a granularity of the time domain resource to be 1 ms, a granularity of the frequency domain resource to be 15 KHz, and the frequency domain resource range to be the whole or a part of a range of an entire bandwidth, when the current service is an Long Term Evolution (LTE) service.

3. The communication resource allocation method of claim 1, wherein determining the granularity information of the time-frequency resource and the frequency domain resource range corresponding to the service type according to the service type of the current service, comprises:
   when the current service is an enhanced Mobile Broadband (eMBB) service, determining a granularity of the time domain resource to be $T_1$, a granularity of the frequency domain resource to be $F_1$, and the frequency domain resource range to be the whole or a part of a range of an entire bandwidth, and $T_1 \leq 1$ ms, and $F_1 > 15$ KHz.

4. The communication resource allocation method of claim 1, wherein determining the granularity information of the time-frequency resource and the frequency domain resource range corresponding to the service type according to the service type of the current service, comprises:
   determining a granularity of the time domain resource to be T2, a granularity of the frequency domain resource to be F2, and the frequency domain resource range to be a part of a range of an entire bandwidth, when the current service is an massive Machine Type Communication (mMTC) service; and
   wherein $T2 \geq 1$ ms, and $F2 \leq 15$ KHz.

5. The communication resource allocation method of claim 1, wherein determining the granularity information of the time-frequency resource and the frequency domain resource range corresponding to the service type according to the service type of the current service, comprises:
   determining a granularity of time domain resource to be T3, a granularity of the frequency domain resource to be F3, and the frequency domain resource range to be a part of a range of an entire bandwidth, when the current service is a Ultra-Reliable and Low Latency Communications (URLLC) service; and
   wherein $T3 \ll 1$ ms, and $F3 \geq 15$ KHz.

6. The communication resource allocation method of claim 1, wherein transmitting the granularity information of the time-frequency resource and the frequency domain resource range corresponding to the service type to the terminal that requests to establish the service bearer, comprises:
   dividing an entire bandwidth into a plurality of frequency domain resource ranges having equal bandwidths, and indicating to the terminal a start point of the frequency domain resource range corresponding to the service type on the entire bandwidth; or
   dividing the entire bandwidth into a plurality of frequency domain resource ranges having unequal bandwidths, and indicating to the terminal a bandwidth size and a start point of the frequency domain resource range corresponding to the service type on the entire bandwidth, or indicating to the terminal a start point and an end point of the frequency domain resource range corresponding to the service type on the entire bandwidth.

7. The communication resource allocation method of claim 6, wherein the plurality of frequency domain resource ranges are not overlapped or partially overlapped.

8. The communication resource allocation method of claim 1, wherein the frequency domain resource range comprises a first frequency domain range for transmitting a reference signal and a second frequency domain range for transmitting data, the first frequency domain range and the second frequency domain range being not overlapped, partially overlapped or completely overlapped.

9. The communication resource allocation method of claim 1, further comprising:
   indicating, via a Downlink Control Information (DCI) signaling, resource block information that is scheduled and allocated to use when the terminal processes the current service, the resource block information comprising frequency domain resource selected from the frequency domain resource range corresponding to the service type.

10. A communication resource allocation method, comprising:
    receiving a first signaling and a second signaling transmitted by a base station, wherein the first signaling is a Radio Resource Control (RRC) signaling;
    acquiring, according to the first signaling, granularity information of time-frequency resource and a frequency domain resource range determined by the base station according to a service type of a current service, and acquiring, according to the second signaling, frequency domain resource selected and allocated by the base station in the frequency domain resource range, wherein the frequency domain resource range comprises a first frequency domain range for transmitting a reference signal and a second frequency domain range for transmitting data, the reference signal is used for synchronization and radio resource management (RRM) measurement, the granularity information of the time-frequency resource is unchangeable, the frequency domain resource range is semi-statically adjustable, and an approximate position of the frequency domain resource range in an entire bandwidth is indicated via the first signaling;

determining resource block information allocated by the base station and used for processing the current service, according to the granularity information of the time-frequency and the frequency domain resource; and processing the current service based on the resource block information.

11. The communication resource allocation method of claim 10, wherein the second signaling is a Downlink Control Information (DCI) signaling.

12. A base station, comprising:
a processor; and
a memory storing a plurality of instructions, which when executed by the processor, causes the processor to:
determine a service type of a current service when a service bearer is established;
determine granularity information of time-frequency resource and a frequency domain resource range corresponding to the service type according to the service type of the current service, wherein the frequency domain resource range comprises a first frequency domain range for transmitting a reference signal and a second frequency domain range for transmitting data, and the reference signal is used for synchronization and radio resource management (RRM) measurement, the granularity information of the time-frequency resource is unchangeable; and
transmit the granularity information of the time-frequency resource and the frequency domain resource range corresponding to the service type, via a Radio Resource Control (RRC) signaling, to a terminal that requests to establish the service bearer, wherein an approximate position of the frequency domain resource range in an entire bandwidth is indicated via the RRC signaling.

13. The base station of claim 12, wherein the processor further:
determines a granularity of the time domain resource to be 1 ms, a granularity of the frequency domain resource to be 15 KHz, and the frequency domain resource range to be the whole or a part of a range of an entire bandwidth, when the current service is an LTE service.

14. The base station of claim 12, wherein the processor further:
determines a granularity of the time domain resource to be T1, a granularity of the frequency domain resource to be F1, and the frequency domain resource range to be the whole or a part of a range of an entire bandwidth, when the current service is an eMBB service; and
wherein $T1 \leq 1$ ms, and $F1 > 15$ KHz.

15. The base station of claim 12, wherein the processor further:
determines a granularity of the time domain resource to be T2, a granularity of the frequency domain resource to be F2, and the frequency domain resource range to be a part of a range of an entire bandwidth, when the current service is an mMTC service; and
wherein $T2 \geq 1$ ms, and $F2 \leq 15$ KHz.

16. The base station of claim 12, wherein the processor further:
determines a granularity of the time domain resource to be T3, a granularity of the frequency domain resource to be F3, and the frequency domain resource range to be a part of a range of an entire bandwidth, when the current service is a URLLC service; and
wherein $T3 << 1$ ms, and $F3 \geq 15$ KHz.

17. The base station of claim 12, wherein the processor further:
divides an entire bandwidth into a plurality of frequency domain resource ranges having equal bandwidths, and indicates to the terminal a start point of the frequency domain resource range corresponding to the service type on the entire bandwidth; or
divides the entire bandwidth into a plurality of frequency domain resource ranges having unequal bandwidths, and indicates to the terminal a bandwidth size and a start point of the frequency domain resource range corresponding to the service type on the entire bandwidth, or indicates to the terminal a start point and an end point of the frequency domain resource range corresponding to the service type on the entire bandwidth; and
the plurality of frequency domain resource ranges are not overlapped or partially overlapped.

18. The base station of claim 12, wherein the frequency domain resource range comprises a first frequency domain range for transmitting a reference signal and a second frequency domain range for transmitting data, the first frequency domain range and the second frequency domain range being not overlapped, partially overlapped or completely overlapped.

19. The base station of claim 12, wherein the processor further:
indicates, via a Downlink Control Information (DCI) signaling, resource block information that is scheduled and allocated to use when the terminal processes the current service, the resource block information comprising frequency domain resource selected from the frequency domain resource range corresponding to the service type.

* * * * *